United States Patent
Pekelny et al.

(10) Patent No.: US 11,763,462 B2
(45) Date of Patent: Sep. 19, 2023

(54) MESH HOLE AREA DETECTION

(71) Applicant: Microsoft Technology Licensing, LLC, Redmond, WA (US)

(72) Inventors: Yuri Pekelny, Seattle, WA (US); Matthew Alexander Joss, Menlo Park, CA (US); Vlad Stefan Burca, Seattle, WA (US); Orion Wilson Elenzil, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 17/156,202

(22) Filed: Jan. 22, 2021

(65) Prior Publication Data

US 2022/0237803 A1 Jul. 28, 2022

(51) Int. Cl.
| | |
|---|---|
| *G06T 11/60* | (2006.01) |
| *G06T 7/13* | (2017.01) |
| *G06T 7/62* | (2017.01) |
| *G06T 17/20* | (2006.01) |

(52) U.S. Cl.
CPC .............. *G06T 7/13* (2017.01); *G06T 7/62* (2017.01); *G06T 17/205* (2013.01); *G06T 2207/20021* (2013.01)

(58) Field of Classification Search
CPC ........... H04R 5/033; G06T 19/20; G06T 7/62; G06T 7/13; G06T 17/20; G06T 17/205; G06T 17/00; B22F 10/85; B22F 10/80
See application file for complete search history.

(56) References Cited

U.S. PATENT DOCUMENTS

2018/0103209 A1* 4/2018 Fischler .................. G06T 7/55

OTHER PUBLICATIONS

Attene, et al., "Polygon Mesh Repairing: An Application Perspective", In Journal of ACM Computing Surveys, vol. 45, Issue 2, Mar. 12, 2013, 33 Pages.
Attene, et al., "ReMESH: An Interactive Environment to Edit and Repair Triangle Meshes", In Proceedings of IEEE International Conference on Shape Modeling and Applications, Jun. 14, 2006, 7 Pages.
Feng, et al., "A Fast Hole-Filling Method for Triangular Mesh in Additive Repair", In Journal of Applied Sciences, vol. 10, No. 03, Feb. 2, 2020, 20 Pages.
Guo, et al., "A Survey on Algorithms of Hole Filling in 3D Surface Reconstruction", In The Visual Computer vol. 34, No. 1, Sep. 2, 2016, 11 Pages.
Liepa, et al., "Filling Holes in Meshes", In Eurographics Symposium on Geometry Processing, Jun. 23, 2003, pp. 200-206.
"International Search Report and Written Opinion Issued in PCT Application No. PCT/US21/064469", dated Apr. 21, 2022, 11 Pages.
Perez, et al., "A Comparison of Hole-Filling Methods in 3D", In International Journal of Applied Mathematics and Computer Science, vol. 26, Issue 4, Dec. 1, 2016, pp. 885-903.

* cited by examiner

*Primary Examiner* — Phuoc H Doan
(74) *Attorney, Agent, or Firm* — Schwegman Lundberg & Woessner, P.A.

(57) ABSTRACT

A computer implemented method includes obtaining a mesh representative of a scanned environment. Boundary edges of the mesh are identified. The boundary edges are grouped into ordered, connected three-dimensional closed non-intersecting polygons. A polygon is classified as a hole, and the area of the hole is determined.

15 Claims, 5 Drawing Sheets

MESH HOLE AREA DETECTION

BACKGROUND

Augmented reality systems utilize a mesh representation of an area that includes objects within the area. The mesh representation may be generated using a scanning device that may be moved around the area while capturing images of the area and objects. The images are converted to a mesh representation which may include triangles that share edges and vertices. Such triangle meshes are well known and used by most augmented or virtual reality systems as well as graphics engines to represent three dimensional environments.

While scanning area to create the mesh representation, there may be some portions of the area that are not properly scanned. Some scanning devices may have difficulty representing areas that are reflective or darker than other areas. In some cases the scanning process may not capture all sides of three dimensional objects. Each of these deficiencies, as well as other deficiencies, can result in holes in the mesh representation, which can significantly degrade the performance of applications utilizing the mesh representation.

SUMMARY

A computer implemented method includes obtaining a mesh representative of a scanned environment. Boundary edges of the mesh are identified. The boundary edges are grouped into ordered, connected three-dimensional closed non-intersecting polygons. A polygon is classified as a hole, and the area of the hole is determined.

DETAILED DESCRIPTION

Figure 1:
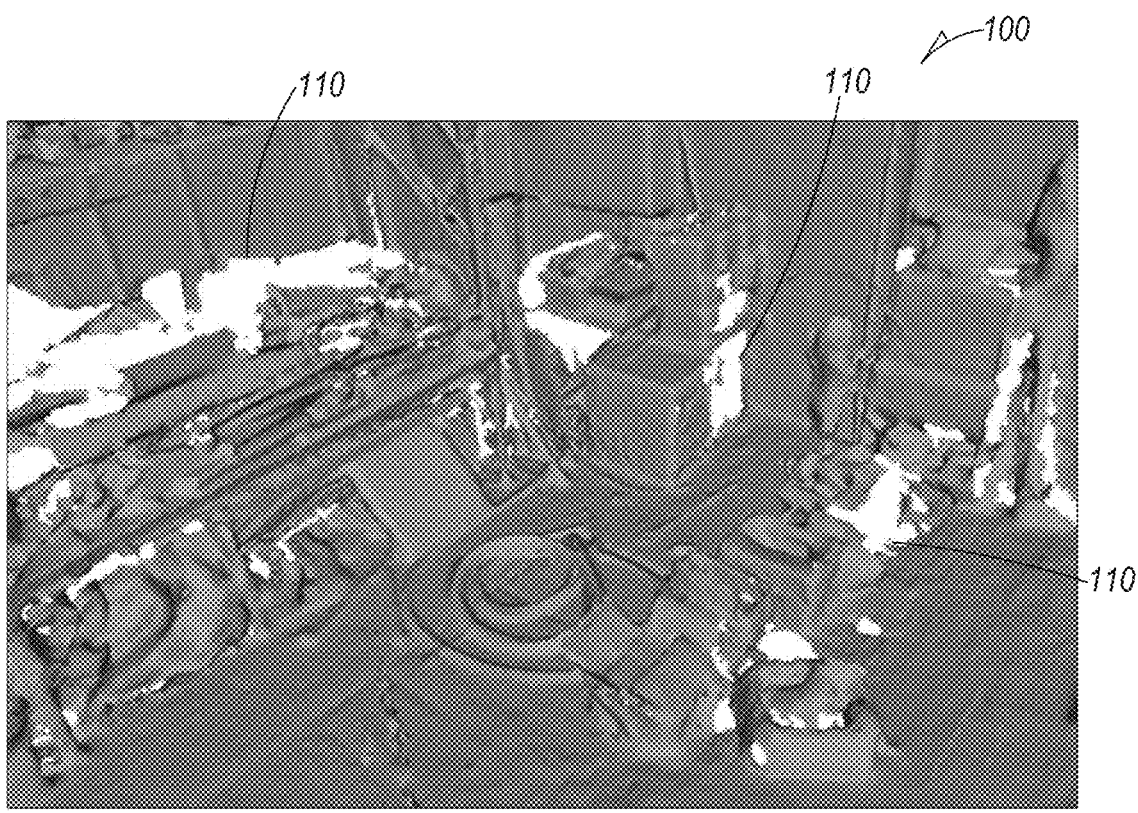
FIG. 1 is an example of an environment reconstruction mesh that has been created using a spatial mapping service according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Meshes are used to digitally reconstruct a scanned environment including three dimensional objects within the environment. A mesh representation of the environment which may include polygons, such as triangles that share edges and vertices. The reconstructed environment may be digitally displayed in a head mounted device. Some head mounted devices utilizing video cameras, or other devices such as Lidar devices may also be used to initially scan the environment in the process of creating the mesh. Example devices include HoloLens®, Kinect®, iPhone® or iPad® devices. It is quite difficult to digitally detect holes in the mesh, much less detect the area of the holes. Such digital detection can be quite useful in helping a user scan the area during the generation of a mesh and can be used to provide real time feedback for a user to scan areas that were missed or otherwise improperly captured.

The feedback can result in a much more accurate and robust mesh being created, resulting in a better user experience in virtual and mixed reality applications as well as better application performance by having a more complete digital representation of the environment. Example feedback can include indications of locations to scan, a percentage completion of scanning, and different angles to scan. The feedback can occur during the initial scanning process and may be provided graphically, such as by the use or arrows pointing to holes, or areas to scan. Blinking or other attributes may be used to indicate areas that need scanning.

The area of holes in a mesh may also or alternatively be used to assess the quality of environment or even individual object reconstruction products. Various examples described herein provide a measurement of approximate percentage of three-dimensional mesh holes without a need for ground truth reconstruction, allowing more efficient calculations for any digital model represented by a three-dimensional mesh and saving processing time. In other words, exact measurements of the environment are not required in order to identify and measure holes.

FIG. 1 is an example of an environment reconstruction mesh 100 that has been created using a spatial mapping service, such as Microsoft HoloLens. Mesh 100 is illustrated in grey scale. Multiple holes 110 are easily viewable by a human. The holes 110 are shown in white and only a few of the holes 110 are labeled with reference number 110 for ease of representation. As can be seen in FIG. 1, if mesh 100 was used for a virtual or augmented reality experience, the view provided to a user would be quite poor.

Figure 2:
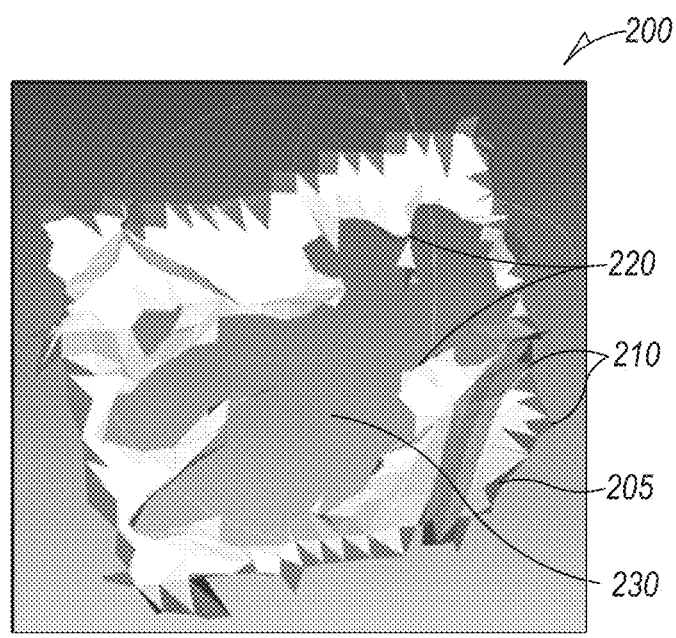
FIG. 2 is an example of a reconstruction mesh for a portion of an environment illustrating boundary polygons according to an example embodiment.

FIG. 2 is an example of a reconstruction mesh 200 for a portion of an environment illustrating boundary polygons. Mesh 200 is a three-dimensional mesh that may be representative of an object or portion of an object in the environment, such as a couch, table, bed, chair, wall, or anything else that might occur in an environment. The mesh is formed of polygons, such as triangles, which are also referred to as mesh faces. Boundary triangles include triangles that have an edge, such as edges 205, wherein the edge is only associated with only one triangle, the boundary triangle, in the mesh. This characteristic is also referred to as edges that have only one adjacent mesh face. External boundary triangles are illustrated at 210. Hole boundary triangles are illustrated at 220. Only a few of such triangles are identified by the respective reference numbers for ease of illustration. The hole boundary triangles define a hole 230, also referred to as a closed polygon.

Figure 3:
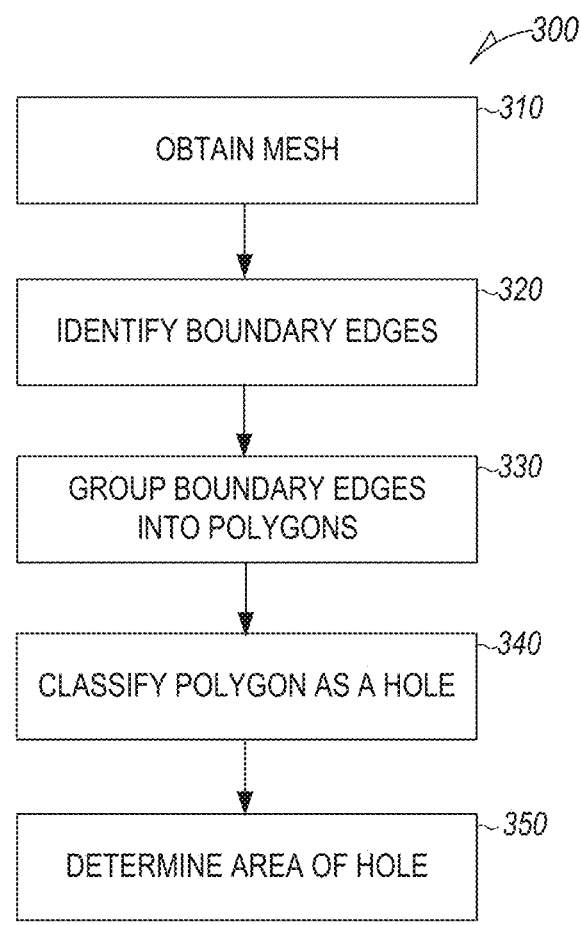
FIG. 3 is a flowchart illustrating a computer implemented method of identifying holes in a mesh representation of an environment according to an example embodiment.

FIG. 3 is a flowchart illustrating a computer implemented method 300 of identifying holes in a mesh representation of an environment. Method 300 begins at operation 310 by obtaining a mesh representative of the scanned environment. The mesh may be obtained from a storage device and may be based on a scanning of the environment. In one embodiment the mesh may be created as the environment is being scanned.

Boundary edges in the mesh are identified at operation 320. Identifying boundary edges in the mesh may be performed by determining edges that have only one adjacent mesh face. The boundary edges are grouped at operation 330 into ordered, connected three-dimensional closed non-intersecting polygons. At least one of the polygons is classified as a hole at operation 340. An area of the hole may be determined at operation 350. Feedback regarding the hole may also be provided in real time, either visually in a reconstructed mesh displayed on a headset or otherwise.

Grouping the boundary edges at operation 330 may include first projecting the connected three-dimensional polygons onto a two-dimensional plane. Since the hole is a three-dimensional construct, when projected onto a flat surface, the boundary of the hole may loop back on itself. A line segment to line segment intersection test may be performed to identify self-intersecting segments or edges. In one embodiment, three-dimensional polygons with self-intersecting projections onto the plane are deemed too complex to be classified with that plane.

In one embodiment, each of the connected three-dimensional polygons may be iteratively projected onto a set of two-dimensional planes from multiple different perspectives, until a projection is found where the edges of the projection do not self-intersect. The largest such non-self-intersecting projection is used for classification of the three-dimensional polygon as either a hole or an external boundary. Once the hole or holes are so identified, the projection may be discarded. In various embodiments, an object in the environment may be viewed from up to 300 or more perspectives in order to identify the best view of a hole polygon. If no projection is found which is not self-intersecting, the three-dimensional polygon remains unclassified as either a hole or an external boundary.

The area of the hole may be calculated by filling the hole with a hole mesh, also referred to as a lid, followed by calculating the area of the hole mesh or lid. Calculating the area of the hole mesh, where the mesh comprises triangles may be performed by calculating the area of each triangle and adding up all the areas. Filling the hole with a hole mesh utilizes only vertices of the hole boundary edges in one embodiment, without introducing new vertices.

In one embodiment, method 300 includes determining respective areas of multiple holes in the mesh and calculating a percentage of hole lid area to overall mesh area that includes the hole lids. This provides a representation of the percentage of the successfully scanned environment and can be used as feedback to a person or user scanning the environment. The feedback may be provided in real time, as the user is scanning the environment, allowing the user to see what areas of the environment may be need further scanning or scanning from a different area in order to more fully capture the environment and improve the mesh representing the environment.

Classifying a three-dimensional polygon as a hole may be performed by examining a non-self-intersecting projection of the faces of the polygon onto a plane, such as those described above. Each projected edge of the polygon may be examined, and its associated projected face may be determined to lie towards or away from the inside of the projected boundary. If the ratio of the number of projected faces lying (or "facing") away from the inside of the projected boundary versus the number of projected faces lying towards the inside of the projected boundary meets or surpasses a certain threshold, the associated three-dimensional polygon is deemed to be a hole, otherwise it is deemed an external boundary. To be entirely certain the boundary is a hole and not an external boundary, this threshold may be set to 1.0. In one embodiment, a threshold of 0.6 may be used. This threshold corresponds to the polygon being classified as a hole if 60% or more of the projected triangles face away from the interior of the boundary. This threshold was found to mostly agree with human perception of a polygon being a hole. Other thresholds below 1.0 may also be used, with a trade-off of false-positives versus false-negatives for hole identification.

Figure 4:
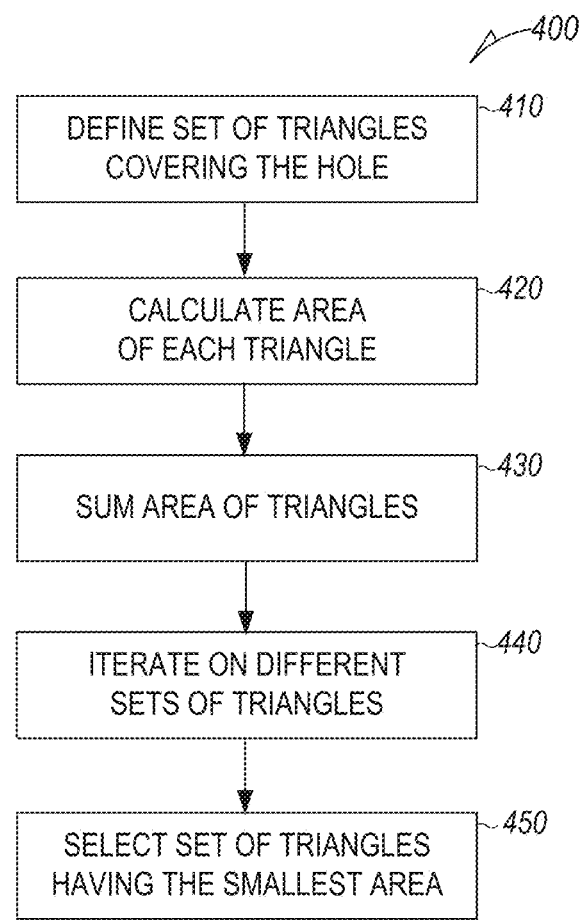
FIG. 4 is a flowchart illustrating a method of determining an area of the hole according to an example embodiment.
Figure 5:
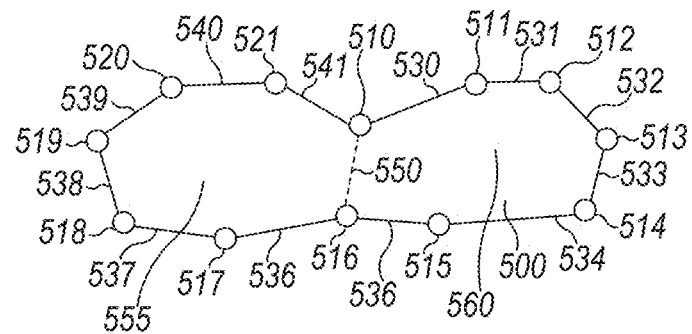
FIG. 5 is a representation of a simple hole having vertices or points defining edges of triangles according to an example embodiment.

FIG. 4 is a flowchart illustrating a method 400 of determining an area of the hole. FIG. 5 is a representation of a simple hole 500 having vertices or points indicated at 510, 511, 512, 513, 514, 515, 516, 517, 518, 519, 520, and 521. The vertices are connected via edges 530, 531, 532, 533, 534, 535, 536, 537, 538, 539, 540, and 541. The edges are hole boundary edges. Not shown are the triangles extending outward from the edges, away from the hole 500, as they are not relevant to determining the area of the hole 500. Thus, the hole 500 may be defined as an ordered list of edge or points within the mesh. Note that the hole is a three-dimensional hole even though represented two-dimensionally in FIG. 4 and may include hundreds if not thousands of points.

One simple method of determining the area of hole 500 includes simply defining a set of triangles covering the hole 500 at operation 410 using the existing vertices at the hole 500 boundary. For example, connecting points 520 and 518 defines a first triangle that includes edges between points 519 and 520, points 520 and 518, and points 518 and 519. Once triangles are defined covering the entire hole 500, the area of each triangle is calculated at operation 420 and then summed at operation 430 to arrive at the area for a first set of triangles.

As can be seen, many different sets of triangles may be obtained that form a hole mesh covering the area of the hole. For example, the next triangle following the triangle defined by points 518, 519, and 520 may be formed by connecting point 520 to point 517, or by connecting point 521 to point 518. Each permutation may be pursued iteratively as indicated at operation 430, with the set of triangles resulting in the smallest area chosen at operation 440.

Figure 6:
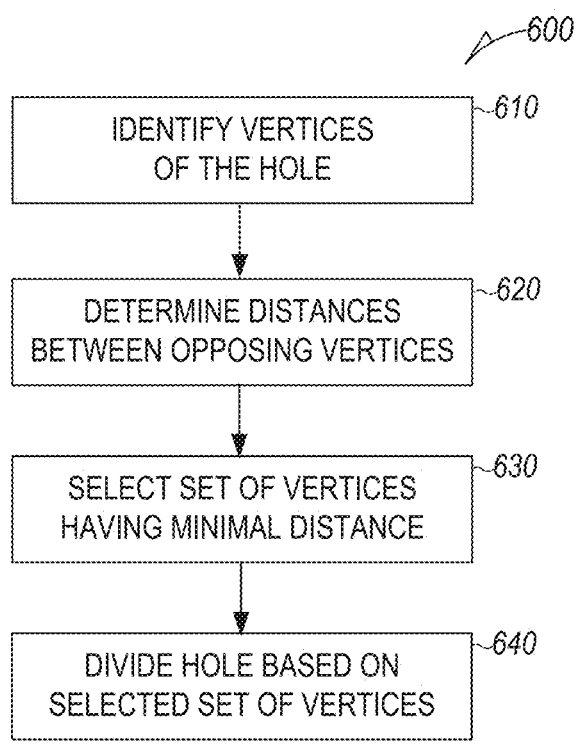
FIG. 6 is a flowchart illustrating an alternative method of determining the area of a hole according to an example embodiment.

FIG. 6 is a flowchart illustrating an alternative method 600 of determining the area of a hole 500. Method 600 utilizes method 400, but first divides the hole 500 into two different holes. At operation 610, hole 500 is divided into two holes by first identifying vertices of the hole. At operation 620, distances between opposing vertices are determined. At operation 630, a set of vertices having the minimal distance between two opposing vertices of the hole is identified. Note that the opposing vertices may be selected such that they are a threshold number of edges away from each other on the hole boundary, such as 4 or 5 or more edges.

Various combinations of vertices may be selected in this manner. Starting at point 521 and applying a threshold of 4, the distance between points 521 and 513, 521 and 514, 521 and 515, and 521 and 516 are determined. Next, starting at point 510, the distance between points 520 and 514, 520 and 515, 520 and 516, 520 and 517, and 520 and 518 are determined. This iterative process may be continued for each of the distances.

At operation 640, the hole is divided into two holes based on the two opposing vertices having the minimal distance. An edge 550 shown as a broken line between points 510 and 516 results in holes 555 and 560 being formed. Visually, one can see that edge 550 is the shortest distance between opposing vertices. At operation 650, method 400 is performed for each hole, with the resulting areas for each hole added together for the overall area of the hole 500.

In further embodiments, holes may be divided into more than two holes, either by further dividing holes 555 and 560, or simply selecting multiple shortest distance opposing vertices to define multiple holes.

Figure 7:
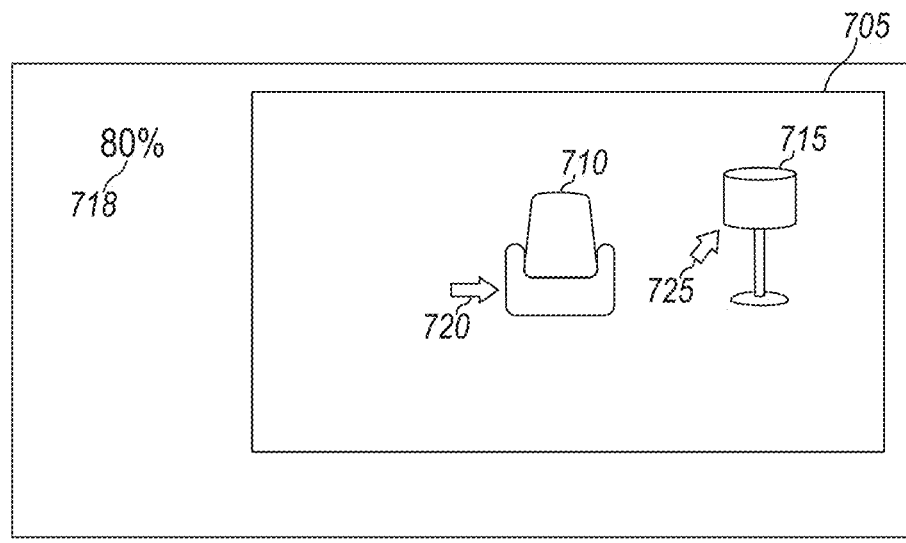
FIG. 7 is a screen shot representation of an interface for scanning an environment according to an example embodiment.

FIG. 7 is a screen shot representation of an interface 700 for scanning an environment. In one example, two objects are shown in a window 705 showing the environment. The objects include a chair 710 and a lamp 715. Window 705 may show a view of the environment via a headset display as a user is scanning the environment or simply viewing the environment. A representation of the hole percentage is shown at 718 as 80%.

Window 705 also includes indications of incomplete scanning of the two objects at 720 and 725. The indications are arrows in one embodiment and may simply point at the object that includes holes or may even identify an angle at which the corresponding object should be further scanned to improve the overall scan by reducing or removing the hole. Indication 725 is one such arrow.

Note that arrow 720 simply points at chair 710. The hole is not visible. Further indications may be provided to alert the user that the hole is on a side of the chair that is not viewable from a current perspective of the user and hence the scanning device. Arrow may appear to indicate the largest holes, and as the mesh is filled in with further scanning, an arrow may move to a next largest hole for further scanning. The user can decide when to stop scanning based on the lack or arrows or a high enough percentage 718, such as more than 90 percent, more than 95 percent or more than 99 percent. More than two arrows may be displayed corresponding to more than two holes, and the size of the displayed arrow may be indicative of the size of the hole in some embodiments.

Figure 8:
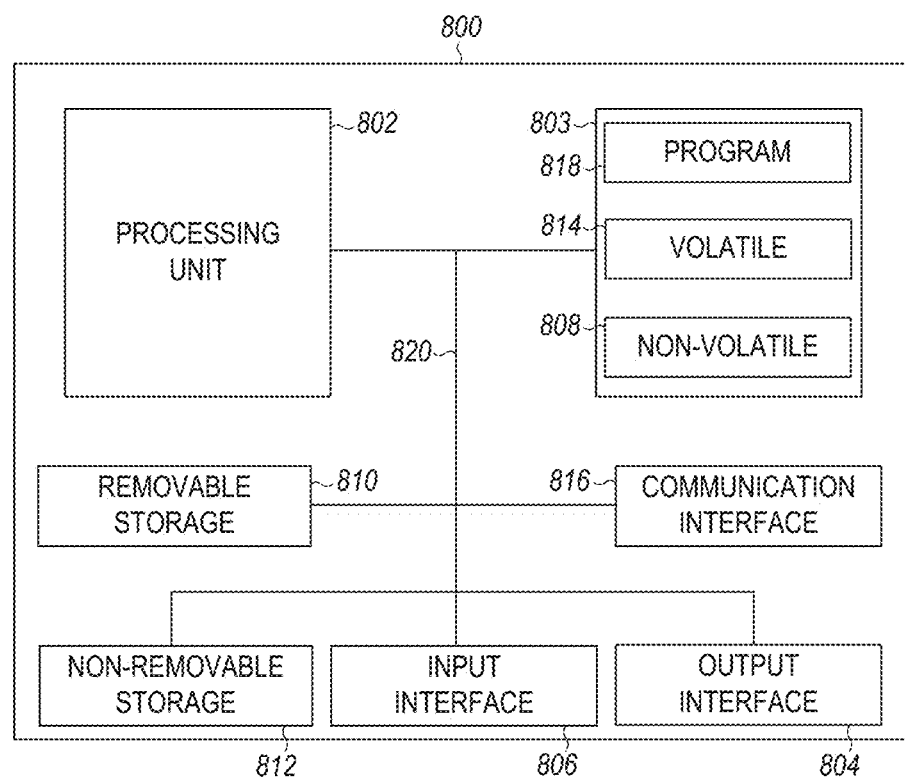
FIG. 8 is a block schematic diagram of a computer system to implement one or more example embodiments.

FIG. 8 is a block schematic diagram of a computer system 800 to implement scanning devices and devices for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 818 along with the workspace manager 822 may be used to cause processing unit 802 to perform one or more methods or algorithms described herein.

EXAMPLES

1. A computer implemented method includes obtaining a mesh representative of a scanned environment, identifying boundary edges in the mesh, grouping the boundary edges into ordered, connected three-dimensional closed non-intersecting polygons, classifying a polygon as a hole, and determining an area of the hole.

2. The method of example 1 wherein grouping the boundary edges includes projecting the connected three-dimensional polygons onto a two-dimensional plane and removing self-intersecting polygons.

3. The method of example 2 wherein the connected three-dimensional polygons are iteratively projected onto a two-dimensional plane from multiple different perspectives until a projection is found where edges of the projection do not self-intersect.

4. The method of any of examples 2-3 wherein classifying a polygon as a hole includes examining each projected edge of the polygon to determine whether the projected edge lies towards or away from an inside of the projected boundary, determining a ratio of projected edges facing away versus facing towards an inside of the projected boundary, comparing the determined ratio to a threshold, and classifying the polygon as a hole in response to the threshold being met or exceeded.

5. The method of any of examples 2-4 wherein determining an area of the hole includes filling the hole with a hole mesh and calculating the area of the hole mesh.

6. The method of example 5 wherein filling the hole with a hole mesh utilizes only vertices of the hole boundary edges.

7. The method of any of examples 1-6 and further including determining respective areas of multiple holes in the mesh and calculating a percentage of hole area to mesh area.

8. The method of any of examples 1-7 wherein identifying boundary edges in the mesh includes determining edges that have only one adjacent mesh face.

9. The method of any of examples 1-8 wherein obtaining a mesh includes scanning the environment and providing feedback regarding the hole.

10. The method of any of examples 1-9 wherein determining an area of the hole includes dividing the hole into multiple holes, finding hole filling polygons to fill each hole, and adding the area of the hole filling polygons.

11. The method of example 10 wherein finding hole filling polygons includes recursively finding sets of polygons for each hole and determining the set of polygons having a smallest area for each hole.

12. The method of example 11 wherein filling the hole with a hole mesh utilizes only vertices of the hole polygon edges.

13. The method of any of examples 10-12 wherein dividing the holes into multiple holes includes identifying vertices of the hole, identifying a minimal distance between two opposing vertices of the hole, and dividing the hole based on the two opposing vertices having the minimal distance.

14. A machine-readable storage device has instructions for execution by a processor of a machine to cause the processor to perform operations to perform a method. The operations include obtaining a mesh representative of a scanned environment, identifying boundary edges in the mesh, grouping the boundary edges into ordered, connected three-dimensional closed non-intersecting polygons, classifying a polygon as a hole, and determining an area of the hole.

15. The device of example 14 wherein grouping the boundary edges includes operations of projecting the connected three-dimensional polygons onto a two-dimensional plane and removing self-intersecting polygons.

16. The device of example 15 wherein determining an area of the hole includes filling the hole with a hole mesh and calculating the area of the hole mesh.

17. The device of any of examples 14-16 wherein determining an area of the hole includes operations of dividing the hole into multiple holes, finding hole filling polygons to fill each hole, and adding the area of the hole filling polygons.

18. The device of example 17 wherein finding hole filling polygons includes operations of recursively finding sets of polygons for each hole and determining the set of polygons having a smallest area for each hole.

19. The device of any of examples 17-18 wherein dividing the holes into multiple holes includes operations of identifying vertices of the hole, identifying a minimal distance between two opposing vertices of the hole, and dividing the hole based on the two opposing vertices having the minimal distance.

20. A device includes a processor and a memory device coupled to the processor and having a program stored thereon for execution by the processor to perform operations. The operations include obtaining a mesh representative of a scanned environment, identifying boundary edges in the mesh, grouping the boundary edges into ordered, connected three-dimensional closed non-intersecting polygons, classifying a polygon as a hole, and determining an area of the hole.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining a mesh representative of a scanned environment;
identifying boundary edges in the mesh;
grouping the boundary edges into ordered, connected three-dimensional closed non-intersecting polygons by projecting the connected three-dimensional polygons onto a two-dimensional plane and removing self-intersecting polygons; and
classifying a polygon as a hole by:
examining each projected edge of the polygon to determine whether the projected edge lies towards or away from an inside of the projected boundary;
determining a ratio of projected edges facing away versus facing towards an inside of the projected boundary,
comparing the determined ratio to a threshold; and
classifying the polygon as a hole in response to the threshold being met or exceeded.

2. The method of claim 1 wherein the connected three-dimensional polygons are iteratively projected onto a two-dimensional plane from multiple different perspectives until a projection is found where edges of the projection do not self-intersect.

3. The method of claim 1 and further comprising determining an area of the hole by:
filling the hole with a hole mesh; and
calculating the area of the hole mesh.

4. The method of claim 3 wherein filling the hole with a hole mesh utilizes only vertices of the hole boundary edges.

5. The method of claim 1 and further comprising:
determining respective areas of multiple holes in the mesh; and
calculating a percentage of hole area to mesh area.

6. The method of claim 1 wherein identifying boundary edges in the mesh comprises determining edges that have only one adjacent mesh face.

7. The method of claim 1 wherein obtaining a mesh comprises:
scanning the environment; and
providing feedback regarding the hole.

8. A computer implemented method comprising:
obtaining a mesh representative of a scanned environment;
identifying boundary edges in the mesh;
grouping the boundary edges into ordered, connected three-dimensional closed non-intersecting polygons;
classifying a polygon as a hole; and
determining an area of the hole by:
dividing the hole into multiple holes;
finding hole filling polygons to fill each of the multiple holes, by recursively finding sets of polygons for each of the multiple holes and determining the sets of polygons having a smallest area for each of the multiple holes; and
adding the area of the hole filling polygons.

9. The method of claim 8 wherein filling the hole with a hole mesh utilizes only vertices of the hole polygon edges.

10. The method of claim 8 wherein dividing the holes into multiple holes comprises:
identifying vertices of the hole;
identifying a minimal distance between two opposing vertices of the hole; and
dividing the hole based on the two opposing vertices having the minimal distance.

11. A machine-readable storage device having instructions for execution by a processor of a machine to cause the processor to perform operations to perform a method, the operations comprising:
obtaining a mesh representative of a scanned environment;
identifying boundary edges in the mesh;
grouping the boundary edges into ordered, connected three-dimensional closed non-intersecting polygons by projecting the connected three-dimensional polygons onto a two-dimensional plane and removing self-intersecting polygons; and
classifying a polygon as a hole by:
examining each projected edge of the polygon to determine whether the projected edge lies towards or away from an inside of the projected boundary;
determining a ratio of projected edges facing away versus facing towards an inside of the projected boundary;
comparing the determined ratio to a threshold; and
classifying the polygon as a hole in response to the threshold being met or exceeded.

12. The device of claim 11 and further comprising determining an area of the hole by:
filling the hole with a hole mesh; and
calculating the area of the hole mesh.

13. The device of claim 12 wherein determining an area of the hole includes operations comprising:
dividing the hole into multiple holes;
finding hole filling polygons to fill each of the multiple holes; and
adding the area of the hole filling polygons.

14. The device of claim 13 wherein finding hole filling polygons includes operations comprising:
recursively finding sets of polygons for each of the multiple holes; and
determining the sets of polygons having a smallest area for each of the multiple holes.

15. The device of claim 13 wherein dividing the holes into multiple holes includes operations comprising:
identifying vertices of the hole;
identifying a minimal distance between two opposing vertices of the hole; and
dividing the hole based on the two opposing vertices having the minimal distance.

* * * * *